J. Seibel.
Harvester Rake.
No. 104,067.                              Patented June 7, 1870.
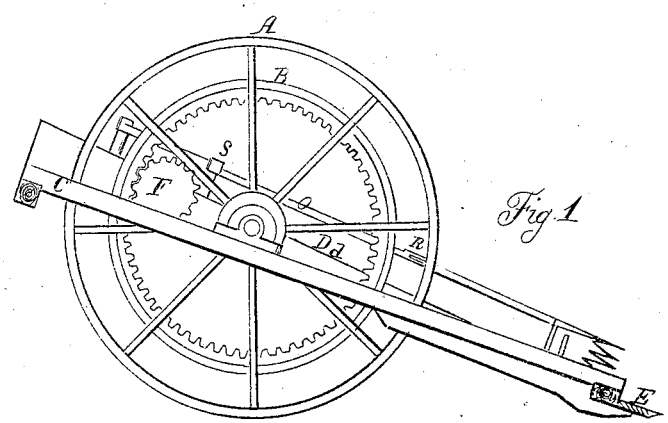
Fig. 1
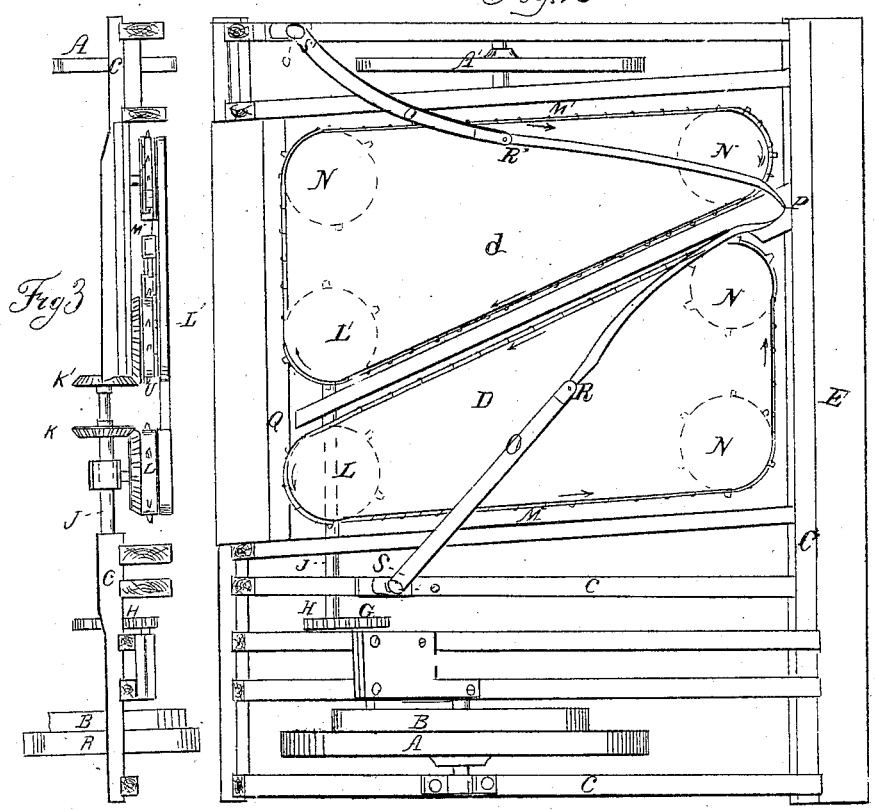
Fig. 2
Fig. 3
WITNESSES:                               INVENTOR:

UNITED STATES PATENT OFFICE.

JACOB SEIBEL, OF MANLIUS, ILLINOIS.

IMPROVEMENT IN HARVESTERS.

Specification forming part of Letters Patent No. 104,067, dated June 7, 1870.

I, JACOB SEIBEL, of Manlius, in the county of Bureau and State of Illinois, have invented certain Improvements in Harvesters, of which the following is a specification:

My improvement consists in the combination of two rakes pivoted on a harvester-platform, so arranged that each rake sweeps around one of the front corners of the said platform, the rakes meeting at the front of the platform, carrying the grain thence diagonally across the platform, delivering it at the rear, as is hereinafter more fully described.

My improvement has for its object to rake the grain as cut by the sickles up an inclined platform, delivering it at the binder's stand in the rear in a good condition for binding, the rakes taking the place of endless aprons, now so generally used in all harvesters on which the grain is so elevated.

*Description of the Accompanying Drawing.*

Figure 1 is a side elevation, showing the inclination of the platform. Fig. 2 is a plan. Fig. 3 is a rear elevation.

*General Description.*

A A' are the wheels of the harvester. The rack B for driving the gearing may be put upon one or both wheels, as preferred. In the drawing the wheel A is represented as used. C is a frame, supported by the wheels, and upon which the platform D d is carried, the sickle-bar E being attached to the frame and carried by it. Any well-known gearing may be used to drive the sickles from the drive-wheel A. F is a cog-wheel, meshing into the rack B. Attached to the shaft of the cog-wheel F is a second and smaller cog-wheel, G, which, in turn, meshes into a third cog-wheel, H, which communicates its motion to the main shaft J, along which, at the proper intervals, are placed two cog-wheels, K K', beveled upon opposite sides, and meshing into the cogs of the two pulleys L L'. These pulleys are so geared as to turn in opposite directions, and carry the endless chains M M' in their circuit around the pulleys N N N N in the course shown by the arrows upon Fig. 2. The platform D d is composed of two parts, D and d, along the edges of which proceed the endless chains M M'. The rakes O O' are attached, by means of a pivot, one to each of the endless chains, and are carried by them around the platform in opposite directions, meeting in front over the sickle-bar at P, and proceeding diagonally back across the platform to the rear, at Q, whence they separate again, to renew their course as before. The rakes consist each of two pieces, jointed together at R R. They also are pivoted to the frame at S S'.

The operation of raking will be as follows: Suppose the rakes to be at Q at the starting of the machine. As the grain commences to fall over the sickle-bar upon the platform, the rakes at the same instant commence to move in opposite directions along the rear of the platform, then down the sides, and meet at P at the moment when sufficient grain to form a bundle has fallen upon the platform. The grain is then swept back by the continuous motion of the rakes to the rear, where the binder's stand may be situated.

*Claim.*

I claim as my invention—

The jointed rakes O O', pivoted to the harvester-frame C, and so arranged upon an inclined harvester-platform D d as to sweep around its front corners, and, meeting at the front, to carry the grain to the binder's stand at the rear, substantially as and for the purpose specified.

JACOB SEIBEL.

Witnesses:
LEWIS L. COBURN,
J. W. MUNDAY.